J. E. EMERSON.
Mode of Inserting Diamonds into Saws for Sawing Stone.
No. 167,882. Patented Sept. 21, 1875.
Fig. 1.
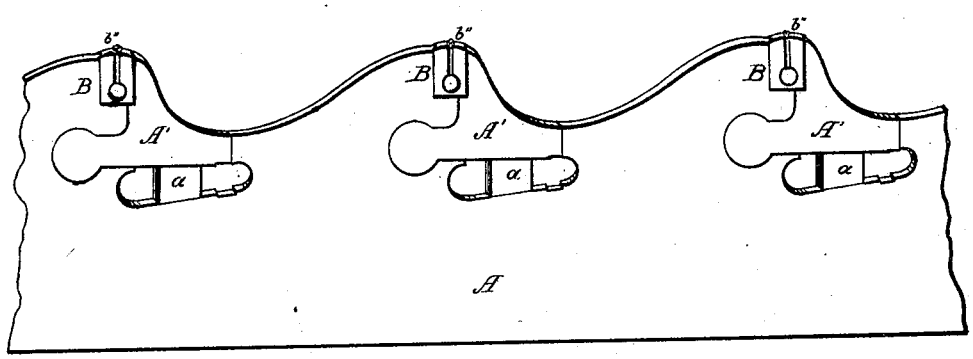
Fig. 2.
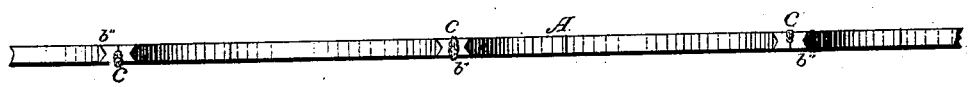
Fig. 3.
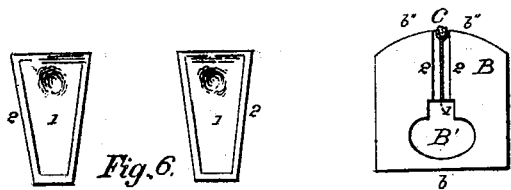
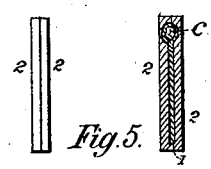
Fig. 5.
Fig. 6.
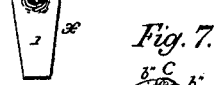
Fig. 7.
Fig. 4.
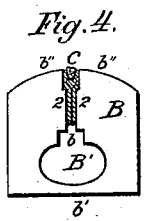
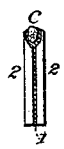
Attest:
C. J. Fritz
J. Mason Kessler
Inventor:
James E. Emerson
by N. Crawford, atty.

UNITED STATES PATENT OFFICE.

JAMES E. EMERSON, OF BEAVER FALLS, PENNSYLVANIA.

IMPROVEMENT IN MODES OF INSERTING DIAMONDS INTO SAWS FOR SAWING STONE.

Specification forming part of Letters Patent No. 167,882, dated September 21, 1875; application filed August 21, 1874.

*To all whom it may concern:*

Be it known that I, JAMES E. EMERSON, of Beaver Falls, in the county of Beaver, in the State of Pennsylvania, have invented a certain new and useful Method of Securing and Inserting Diamonds or Carbons in Metallic Plates and Holders to be used in Saws for Sawing Stone or other analogous purposes, of which the following is a specification:

Wherever diamonds are used, and particularly when used in saws, whether reciprocating or rotary, for sawing stone, they should be so perfectly set or embedded that no strain upon them will in the least disturb their position, for whenever they are so disturbed their usefulness is ended, and the diamonds liable to be lost or broken. It has also been very difficult to set the diamonds in a saw so that the extreme points will coincide with each other as to projection from the edge and sides of the saw-plate to give a smooth cut, and a pathway for the saw, so that the saw will clear itself in the kerf, and the sides of the kerf be smooth and true.

The object of this invention is to overcome the difficulties above enumerated; and it consists in the mode of setting or embedding the diamonds or carbons in metal plates or beds, and holding them, as will be fully hereinafter described.

In the drawings, Figure 1 represents a side view of the saw; Fig. 2, an edge view of the same; Fig. 3, a side view of a spring diamond holder or clamp; Fig. 4, a modification of same; and Figs. 5, 6, and 7, details.

A represents the saw-plate as having removable diamond-holders clamped and held in place by my method of clamping the holders in saw-blades, as seen in patents previously granted to myself. B is the holder made from a single piece of steel plate, with opening B' near its base, and a central slot, $b$, from opening B' to the outside of holder to receive the metal plates in which the diamonds are set or embedded. The base of the holder at $b'$ is tempered to be a spring, so that the two holding-jaws $b''$ $b''$ can be sprung apart by placing a bar of metal into the enlarged part of the central slot, and forcing the said jaws apart, when the metal plates that hold the diamond can be inserted in, or removed from, the slot, and when the bar or lever is removed the jaws will spring toward each other and hold the plates that the diamonds are set in firmly in their position, when the holder can be inserted in the saw-plate and clamped therein, as seen in Fig. 1. The slot $b$ has plain smooth sides that are parallel, or nearly so, their entire length; or it may be, when the holder is without the diamond and the plates in which the diamonds are embedded, a trifle narrower at its outer opening than at its inner end toward the opening B', so as to compensate for the springing apart of the jaws $b''$ to receive the plates in which the diamond is held, and insure a close fit at the extreme outer point of contact of the jaws with the plates that carry the diamond.

Heretofore the diamonds have been set into the jaws $b''$ of the holder by embedding them therein, by removing the metal; but as the diamonds are of irregular form, and no two alike in form or size, when a diamond is broken or becomes loose in its bed in the holder, a second diamond cannot be fitted and secured in the same holder, and the holder, of necessity, is discarded and thrown aside to make place for a new one with a new diamond therein, which is expensive; but by a new method, that I now describe, the holder B is saved, and can be used with any number of diamonds, C, each having a different form and size, by first embedding the diamond in some soft sheet metal (copper preferred) that is previously wound or folded around it, as seen at 1 in Figs. 3, 5, and 6, by pressure applied to the entire surface, so that the copper or soft metal shall be compacted upon every part of the diamond. Then the diamond C and its copper or soft-metal case or covering 1 is placed between two soft-iron or steel plates, 2 2, and force applied sufficient to press the diamond and its soft-metal casing into the face of the plates 2 2, so that the plates will come together, as seen in Fig. 5 in edge view, or in Fig. 6, where the casing 1 is seen in side view at $x$, and in the face of the plates 2 2, as indented therein. Hard rubber or other substance instead of copper may be used to wrap around the diamond; but I prefer the sheet-copper. When the diamond C and its casing 1 are thus embedded in plates 2 2 the metal is then removed from the outer end and sides of the plates by chipping, grinding, filing, or other means, until the diamond is exposed, and projects at the end and sides a sufficient distance. The plates 2 with the diamond C are then inserted between the jaws $b''$ $b''$ in slot $b$ of holder B, and the holder then clamped in the saw-blade, as seen in Fig. 1, by means of the clamp-piece A' and wedge $a$.

In placing the diamonds relatively with the saw-plate it is usual to select a wide one that will be as wide as the saw-plate is thick or a little wider, and insert centrally in the thickness of the saw-plate, and then on each side of this a narrower diamond that will cut to the width of the kerf on each side, while the wide one will clean out all the stone intermediate between what the narrow diamonds cut on either side of the saw-plate, as seen in Fig. 2.

A very good set for the diamond can be obtained by simply pressing it into the plates 2 2, casing the diamonds with the soft metal and pressing the casing with the diamonds into the metal plates 2 when the plates are cool, for then the danger of breaking the diamonds is avoided, as might be the case when pressed naked into the cool plates or into heated metal, whether the jaws of the holder or other plates. The outer edge of the holder B is case-hardened to prevent wear by contact with the dust cut by the diamonds.

This method or process of completely setting and holding diamonds can be used in other tools for working in stone, such as drills, augurs, and planing-machines, without departing from the principle or mode of construction.

Other modes of clamping the holder B in the saw-plate may be used, as the method of clamping shown is the same as is used in my previous patents, and the description of its construction and operation is not necessary here.

I am aware of the patent dated June 8, 1869, No. 91,155, and lay no claim to any construction therein shown.

Having thus described my invention, what I claim is—

1. The process of fitting and setting diamonds into metallic plates by first incasing them in soft tough metal by gentle and even pressure, and then pressing the diamonds and their casings into harder-metal plates, substantially as described.

2. The process of fitting and holding diamonds in metallic plates or surfaces by embedding them by pressure into the metal when the metal is soft and cold, substantially as described.

3. The spring-holder B, having slot $b$, in combination with the metal plates 2 2, metal casing 1, and diamond C, constructed in the manner and for the purposes described.

4. The mode or process, as above described, of embedding diamonds in metal plates, and then removing the surplus metal to expose the cutting-edges of the diamonds, and fitting the cutting-edges to the exact position with relation to the saw by removing the metal around the diamond, substantially as described.

JAMES E. EMERSON.

Witnesses:
　JOHN MCCARTY,
　JOHN M. WAY.